(12) United States Patent
Mitterreiter

(10) Patent No.: US 8,604,778 B2
(45) Date of Patent: Dec. 10, 2013

(54) ANGLE MEASURING SYSTEM

(75) Inventor: Johann Mitterreiter, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 598 days.

(21) Appl. No.: 12/921,344

(22) PCT Filed: Feb. 5, 2009

(86) PCT No.: PCT/EP2009/051308
§ 371 (c)(1),
(2), (4) Date: Sep. 7, 2010

(87) PCT Pub. No.: WO2009/112314
PCT Pub. Date: Sep. 17, 2009

(65) Prior Publication Data
US 2011/0012591 A1 Jan. 20, 2011

(30) Foreign Application Priority Data
Mar. 10, 2008 (DE) .......................... 10 2008 013 378

(51) Int. Cl.
*G01B 7/14* (2006.01)
*G01B 7/30* (2006.01)
*G01D 5/14* (2006.01)

(52) U.S. Cl.
CPC ..................................... *G01D 5/145* (2013.01)
USPC .................................. 324/207.2; 324/207.25

(58) Field of Classification Search
None
See application file for complete search history.

(56) References Cited

U.S. PATENT DOCUMENTS

| | | | |
|---|---|---|---|
| 5,434,503 A * | 7/1995 | Rigaux et al. ................. | 324/174 |
| 5,528,139 A | 6/1996 | Oudet et al. | |
| 5,609,184 A | 3/1997 | Apel et al. | |
| 5,789,917 A | 8/1998 | Oudet et al. | |
| 6,043,645 A | 3/2000 | Oudet et al. | |
| 6,535,135 B1 | 3/2003 | French et al. | |
| 6,894,484 B2 | 5/2005 | Takizawa et al. | |
| 7,019,517 B2 | 3/2006 | Hagan | |
| 7,534,046 B2 * | 5/2009 | Yamamoto ..................... | 384/448 |
| 7,733,083 B2 * | 6/2010 | Ozaki et al. .............. | 324/207.25 |

FOREIGN PATENT DOCUMENTS

| | | |
|---|---|---|
| EP | 0 665 416 | 8/1995 |
| WO | 95/14911 | 6/1995 |
| WO | 02/01086 | 1/2002 |
| WO | 2006/020201 | 2/2006 |

OTHER PUBLICATIONS

International Search Report, issued in corresponding International Application No. PCT/EP2009/051308, 2009.
International Preliminary Examination Report, issued in corresponding International Application No. PCT/EP2009/051308, 2009.

\* cited by examiner

*Primary Examiner* — Paresh Patel
(74) *Attorney, Agent, or Firm* — Kenyon & Kenyon LLP

(57) ABSTRACT

An angle measuring system includes a first component group and a second component group, the first component group being mounted so as to be rotatable relative to the second component group. The first component group includes a ring having a running surface and an angle scaling. The second component group has a sensor for scanning the angle scaling as well as a printed circuit board having an electronic circuit for evaluating sensor signals producible by the scanning. The second component group furthermore includes a solid ring, on which another running surface is situated and which has a first recess for accommodating the circuit board and a second recess for accommodating an electrical conductor. The conductor connects the sensor electrically to the electronic circuit situated at a distance from the sensor.

13 Claims, 3 Drawing Sheets

ANGLE MEASURING SYSTEM

FIELD OF THE INVENTION

The present invention relates to an angle measuring system.

BACKGROUND INFORMATION

Such angle measuring systems are used to measure rotary motions and rotational positions of a machine part, for instance, a shaft. The rotary motion is detected either incrementally or absolutely; the output measured value is a sequence of counting pulses, for example, a counter value or a code word. Corresponding angle measuring systems are used particularly in so-called pick-and-place machines in the manufacture of electronic components, or in machine tools for measuring rotary movements. The reproducibility or repeatability of the rotational angles of machine parts to a precision of only a few angular seconds is very important when working with pick-and-place machines, for instance. In particular, the absolute accuracy of the measuring results of an angle measuring system is crucial in the case of machine tools. Certain conventional angle measuring systems which have a separate bearing assembly of the component parts rotatable relative to each other.

The accuracy of an angle measurement is influenced by the quality of the angle scaling, its eccentricity and by the radial runouts of the bearing assembly or wobble errors.

U.S. Pat. No. 6,894,484 describes a bearing having an angle measuring device, in which a sensor unit is insertable as an exchangeable module in an entirely cylindrical recess of the outer ring.

This device has the disadvantage that the angle measuring systems manufactured according to this principle do not achieve the highest accuracies, are not sufficiently robust for many applications and, moreover, require a relatively great amount of space.

SUMMARY

Example embodiments of the present invention provide a robust angle measuring system, which provides a very precisely operating and compact angle measuring system in a simple construction.

According to example embodiments of the present invention, an angle measuring system includes a first component group and a second component group, the first component group being mounted so as to be rotatable about an axis relative to the second component group. Furthermore, the first component group includes a ring having a running surface and an angle scaling. The second component group has a sensor for scanning the angle scaling as well as a printed circuit board having an electronic circuit for evaluating sensor signals producible by the scanning. In addition, the second component group includes a solid ring on which another running surface is situated, and also has a first recess for accommodating the printed circuit board. The second component group further has a second recess for accommodating an electrical conductor. The electrical conductor is situated at a distance from the sensor and electrically connects the sensor to the electronic circuit.

Recesses in the form of chambers are thus worked directly into the solid ring of the second component group, the recesses having different volumes or cubic contents and being in particular contiguously situated. To optimize the stability of the ring, geometries of the recesses deviate from cylindrical forms.

An extension of the first recess in the ring of the second component group in a direction parallel to the axis may be greater than an extension of the first recess in the circumferential direction. In particular, the greatest extension of the first recess in a direction parallel to the axis is greater than the greatest extension of the first recess in the circumferential direction.

The running surfaces are the surfaces or paths along which the rolling elements roll during the operation of the angle measuring system. From the paraxial view, the running surfaces of the ring of the first component group may be convex, while the running surfaces of the ring of the second component group may be concave.

The ring of the first component group may be located radially inside and may then also be denoted as inner ring, while the ring of the second component group in this case may be located radially outside, and may be defined as outer ring.

The ring of the second component group has an axial outside dimension which is, e.g., at least 1.5 times as great as the extension of the first recess in the ring of the second component group in a direction parallel to the axis. In particular, the axial outside dimension of the respective ring may be at least 1.75 times or at least 2 times as great as the extension of the first recess in the ring of the second component group in a direction parallel to the axis.

The ring of the second component group may have a third recess for accommodating the sensor.

Especially with a view to an interference-resistant construction of the angle measuring system, the ring of the second component group may be arranged as a metallic ring, in particular as a steel ring.

The extension of the first recess may be greater than the extension of the second recess, respectively in relation to a direction parallel to the axis. This applies in particular to the respectively greatest extensions of the second recess.

The electrical conductor may have a cross-section of different outside dimensions, for example a rectangular cross-section, that has two different edge lengths as the respective outside dimension. The larger outside dimension is situated in a direction parallel to the axis. The same consideration may also be applied to conductors having an elliptical cross-section for example.

The first recess may be arranged such that the printed circuit board is insertable into the first recess in the radial direction, especially in a direction toward the axis. In particular, the first recess then has an opening on the outer circumference of the ring of the second component group. Furthermore, the third recess may be arranged such that the sensor is insertable into the third recess in a direction leading away from the axis, radially to the outside. Accordingly, the third recess may have an opening on the inner circumference of the ring of the second component group.

For example, the sensor may also be mounted on the second component group, in particular exclusively, prior to the assembly of the first component group, the second component group and the rolling elements. In particular, the electrical conductor may also be mounted on the second component group prior to the assembly of the first component group, the second component group and the rolling elements.

According to example embodiments of the present invention, the angle measuring system includes a first component group, a second component group and a sensor, the first component group being mounted so as to be rotatable about an axis relative to the second component group. The first component group includes a ring having a running surface and having an angle scaling. The second component group has another ring having another running surface and the sensor for scanning the angle scaling. Rolling elements are disposed between the running surfaces of the first and second component groups. The angle scaling is applied such that a geometric pattern of the angle scaling in a first region deviates from a geometric pattern of the angle scaling in a second region as a function of radial runouts of the running surfaces and/or of the rolling elements.

The geometric patterns of the angle scaling in the angle measuring system are thus a function, inter alia, of the individual dimensions or dimensional deviations of the respective running surfaces and/or of the rolling elements provided in the angle measuring system.

The angle scaling may be applied on a component of the first component group; the component may then be connected as a separate component, for instance as a graduation ring, in rotatably fixed manner to the ring, or else may be implemented as an integral part of the ring of the first component group. The latter is the case, for instance, when the angle scaling is applied directly on the ring.

The ring of the second component group may have a radially traversing opening, through which the angle scaling is able to be applied. The opening may be formed such that it has an axial extension which is less than ⅓, in particular less than ⅕, of the axial outside dimension of the ring of the second component group.

For example, the angle scaling is disposed on a lateral side of the graduation ring. The term lateral side should be understood to refer to a cylindrical surface or peripheral surface which is either closed around 360° or represents only a part of a peripheral surface. The angle scaling may then be aligned with a directional component parallel to the axis.

The angle scaling and the sensor may be equipped for magnetic, inductive or capacitive scanning, for example.

The angle scaling is frequently made up of regions having different magnetic polarization. In this case, the magnetized regions are then aligned with a directional component parallel to the axis, so that north poles and south poles alternate with each other quasi as magnetic graduation marks in the circumferential direction. In particular, the angle scaling may also be made up of a plurality of tracks, for example, when the absolute angular position of a shaft to be measured is to be ascertainable directly by the angle scaling.

Alternatively or in addition to the substantially axial alignment of the angle scaling, the angle scaling may also be aligned with a radial directional component. In this case, at least a part of the angle scaling is applied on the face of the relevant component of the first component group.

The angle scaling may be applied on a component, particularly a graduation ring, of the first component group, which is made of a magnetizable material. The graduation ring may be made of a magnetically hard material having a coercive field strength of at least 1 kA/m. The coercive field strength is between, for example, 10 kA/m and 60 kA/m, e.g., between 25 kA/m and 45 kA/m.

For example, an MR sensor or a Hall sensor may be used as the sensor.

Particularly good measuring accuracies of the angle measuring system are achieved if the first component group and the second component group as well as the rolling elements are implemented such that the first component group and the second component group are disposed so as to be axially and/or radially free from play with respect to each other.

The first and the second component groups may in each case have two running surfaces, between which rolling elements are disposed. The angle scaling as well as the opening through which the angle scaling is able to be applied may be disposed axially between these running surfaces.

The angle measuring system may be arranged so that its maximum axial extension is less than 40%, e.g., than 30% of the maximum outside radius of the angle measuring system. Furthermore, the angle measuring system may have a relatively large opening for accommodating a shaft to be measured, the radius of the opening being, for example, at least 50%, e.g., at least 60% of the maximum outside radius of the angle measuring system. For example, this opening is bounded by the inside diameter of the inner ring, while the outside radius of the outer ring represents the outside radius of the angle measuring system.

Further features and details of example embodiments of the angle measuring system are described below with reference the accompanying figures.

DETAILED DESCRIPTION

Figure 1:
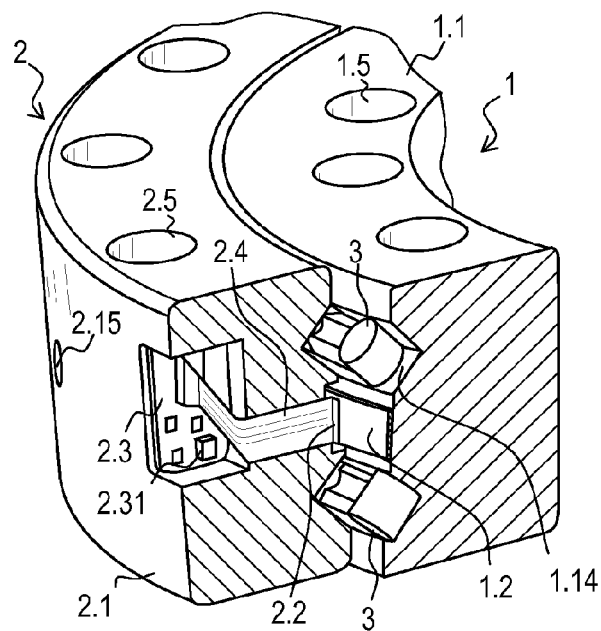
FIG. 1 is a partial cross-sectional view through an angle measuring system.

According to FIG. 1, the angle measuring system according to an example embodiment of the present invention includes a first component group 1 and a second component group 2, first component group 1 being used as a rotor and second component group 2 being used as a stator in the presented exemplary embodiment. First component group 1 includes a ring which, in the present exemplary embodiment, is designated as inner ring 1.1. Correspondingly, a further ring, which is assigned to second component group 2, is designated here as outer ring 2.1.

In the method for manufacturing an angle measuring system, inner ring 1.1 and outer ring 2.1 are manufactured first. To this end, the contours are initially worked out comparatively roughly by cutting. Axial outside dimension Z (see FIG. 4b) of outer ring 2.1 is 70 mm in the present exemplary embodiment. Furthermore, a radially aligned opening 2.15, here in the form of a cylindrical bore hole, is worked into outer ring 2.1. The axial extension z of opening 2.15, or the diameter of the bore hole, is 10 mm, which thus yields a ratio of z/Z=1/7. In addition, in this manufacturing phase, a cavity is worked into outer ring 2.1, which includes three chambers or recesses 2.11, 2.12, 2.13. The radially outermost recess 2.11 has the greatest volume. Recess 2.12 situated further inside connects the two adjacent recesses 2.11 and 2.13.

In a further operation, finely machined running surfaces 1.14, 2.14 are respectively produced on inner ring 1.1 and outer ring 2.1 by a lapping process.

In the course of the further assembly, a sensor 2.2, e.g., an MR sensor, together with an electrical conductor 2.4, in this case a flexible conductor, are then mounted in outer ring 2.1. Electrical conductor 2.4 has a rectangular cross-section, and therefore has different outside dimensions B, d. Thickness d is relatively small in relation to width B. During assembly, electrical conductor 2.4 is introduced from the inner side of outer ring 2.1 into third recess 2.13, the larger outside dimension B of electrical conductor 2.4 being disposed in a direction parallel to axis A. Afterwards, sensor 2.2 and electrical conductor 2.4 are moved radially outward until sensor 2.2 is placed in third recess 2.13, and electrical conductor 2.4 projects through second recess 2.12 into first recess 2.11. Accordingly, third recess 2.13 is arranged such that sensor 2.2 may be inserted into recess 2.11 in a direction leading away from axis A.

Next, the end of electrical conductor 2.4 is pulled radially outward, so that it is outside of outer ring 2.1. In this position, this end of electrical conductor 2.4 is then connected to an electric coupling 2.32 on a printed circuit board 2.3. A plurality of electronic components is situated on printed circuit board 2.3, among others, one having an electronic circuit 2.31 for evaluating signals of sensor 2.2. First recess 2.11 is open radially to the outside, thus, is configured so that printed circuit board 2.3 may be introduced into recess 2.11 in a direction toward axis A. Accordingly, printed circuit board 2.3 is thus inserted into first recess 2.11, and is then fixed in position in first recess 2.11. In so doing, printed circuit board 2.3 is oriented such that it is aligned parallel to axis A, that is, the plane of printed circuit board 2.3 is parallel to axis A.

In addition, a graduation ring 1.2 is mounted on the outer circumference of inner ring 1.1. This graduation ring 1.2 is made of a magnetically hard material, in this case an iron-cobalt-chromium alloy having a coercive field strength of approximately 38 kA/m. In this phase, graduation ring 1.2 has no angle scaling 2.11, i.e., no graduation pattern.

Afterwards, inner ring 1.1 together with graduation ring 1.2 and outer ring 2.1 as well as rolling elements 3 are assembled such that rolling elements 3 are situated between both running surfaces 1.14, 2.14. As a result of the geometric dimensions of inner ring 1.1, of rolling elements 3 and of outer ring 2.1, a radial and axial prestress is produced between inner ring 1.1 and outer ring 2.1. Thus, a system is produced in which first component group 1 is rotatable about an axis A relative to second component group 2, component groups 1, 2 being disposed so as to be axially and radially free from play with respect to each other due to the axial and radial prestress.

Because printed circuit board 2.3 having electronic circuit 2.31 in first recess 2.11 is surrounded by solid outer ring 2.1, optimal protection is provided against electromagnetic interferences. The same holds true for electrical conductor 2.4 in second recess 2.12 and for sensor 2.2 in third recess 2.13, as well. In this connection, it should be observed that due to the precise fabrication of outer ring 2.1, of rolling elements 3 and of inner ring 1.1, a minimal gap is achieved between outer ring 2.1 and inner ring 1.1, which has a positive effect on the electromagnetic interference resistance. To increase the electromagnetic interference resistance further, first recess 2.11 may be closed on the outside by a cover, in particular by a metal cover. Furthermore, first recess 2.11, and possibly also second and third recesses 2.12, 2.13, may be filled with a suitable potting material. For example, a cable outlet may be provided through a bore hole in the cover for the electrical connection between the angle measuring system and sequential electronics.

Figure 2:
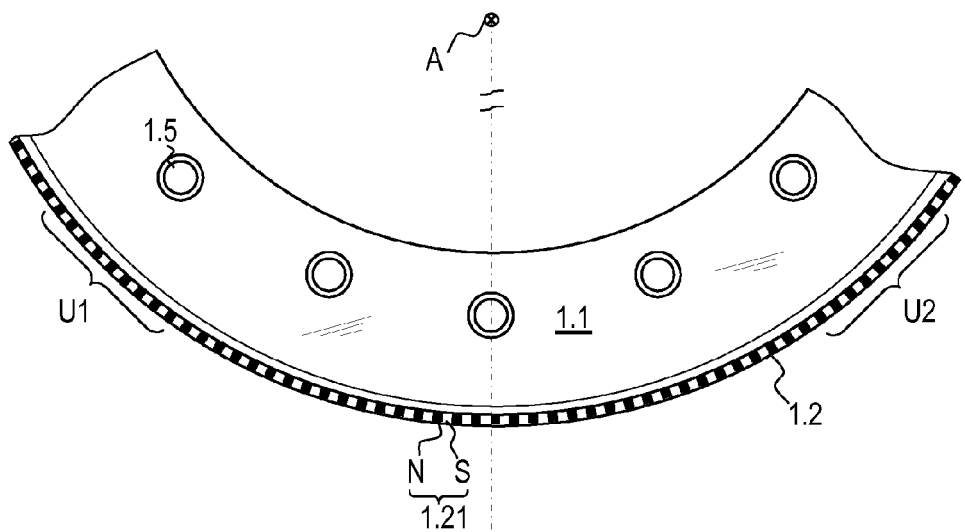
FIG. 2 is a partial top view of a ring of the angle measuring system having an angle scaling.
Figure 3:
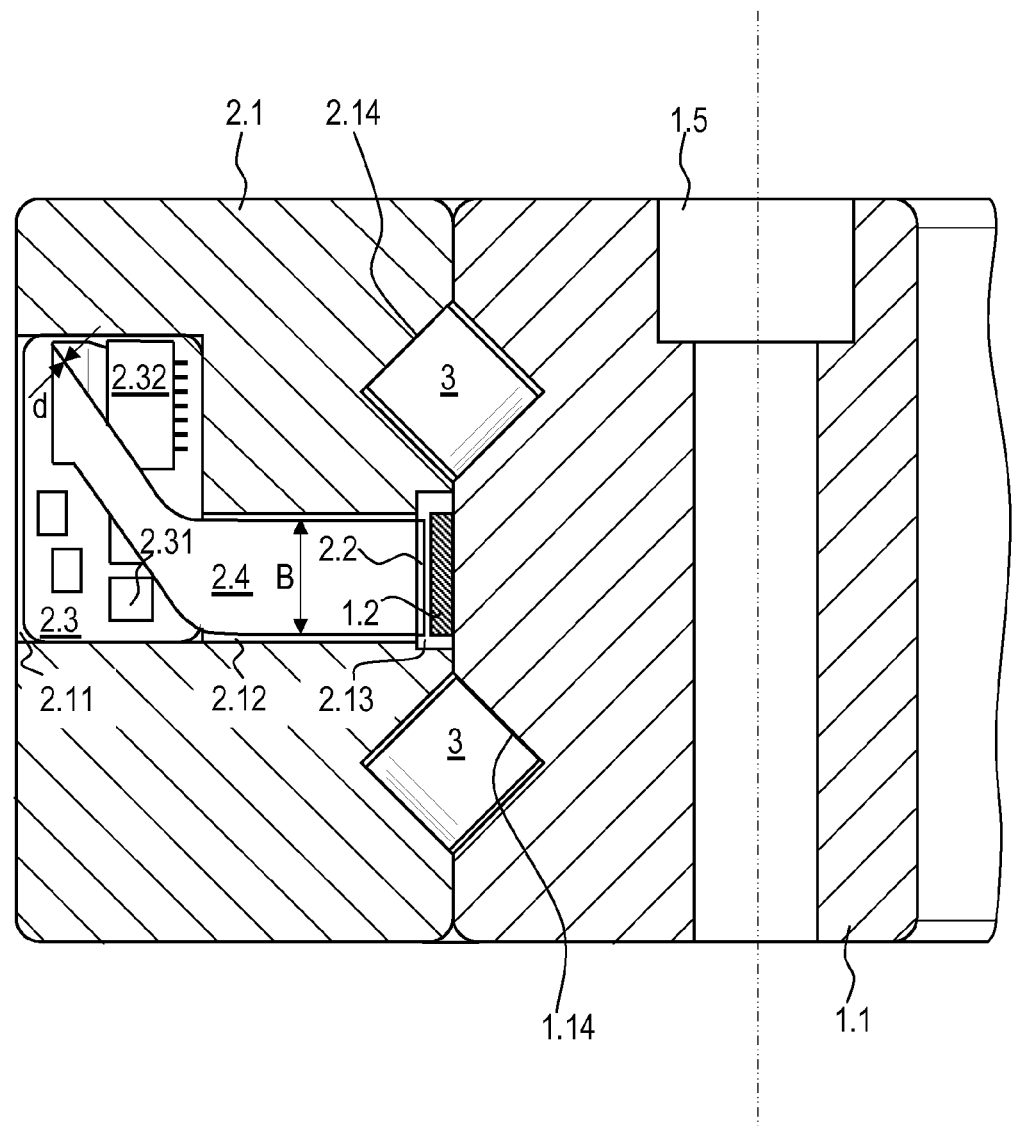
FIG. 3 is a cross-sectional view through the angle measuring system.

The unit assembled to this point is secured to a scaling machine. The scaling machine is used to apply an angle scaling 1.21 (FIG. 2) to graduation ring 1.2. The scaling machine includes a shaft and a stator block, to which a magnetic writing head is attached. The stator block and the shaft are rotatable relative to each other using an air bearing. The scaling machine also includes an extremely exact angular position measuring device, which is used to determine precisely the angular position of the shaft relative to the stator block.

Prior to applying angle scaling 1.21, inner ring 1.1 is first secured in rotatably fixed manner to the shaft of the scaling machine. In the same manner, outer ring 2.1 is also affixed to the stator block. In this mounting state, a rotation of the shaft consequently brings about a rotation of inner ring 1.1, and therefore of graduation ring 1.2, as well.

Subsequently, the magnetic writing head is inserted into opening 2.15. Angle scaling 1.21, made up of a plurality of magnetic (not visible) graduation marks, is thereupon applied directly onto the lateral side of graduation ring 1.2. In the process, graduation marks substantially parallel with respect to axis A are produced step-by-step as angle scaling 1.21 on the lateral side by suitably energizing the writing head, north and south poles alternating with each other along the periphery. Each graduation mark is radially polarized. In the exemplary embodiment presented, the distance between the centers of the graduation marks in the circumferential direction is 200 μm. After each graduation mark is produced on the lateral side of graduation ring 1.2, the shaft is further turned by a minimal amount such that the next graduation mark may be applied. Thus, between the respective magnetizing steps, graduation ring 1.2 is further swiveled about axis A, controlled by the angular position measuring device of the scaling machine. Despite the exceedingly precise manufacture of inner ring 1.1, outer ring 2.1 and rolling elements 3, the system still exhibits deviations from its ideal geometry. Accordingly, radial runouts result in different geometric patterns of angle scaling 1.21 in the circumferential direction, because angle scaling 1.21 is applied on graduation ring 1.2 in an installation situation which corresponds to the final mounting, and in addition, the system is radially and axially prestressed. Thus, due to the mentioned radial runouts, e.g., an eccentricity or a wobble error, the geometric pattern of angle scaling 1.21 in region U1 may differ from the pattern in region U2, and specifically, as a function of the radial runout existing locally at the respective circumferential points. As a result, different patterns may be characterized by different spacings of the graduation marks or by different inclinations of the graduation marks relative to axis A. Because of the high degree of precision, these differences in the patterns of individual regions are comparatively small. Nevertheless, they contribute to the increase in the measuring accuracy of the angle measuring system.

After angle scaling 1.21 is applied, the unit preassembled to this point, made up of first and second component groups 1, 2, may be detached from the scaling machine.

Due to the exceedingly high mechanical stiffness of the angle measuring system, the measuring result is improved on one hand because of the minimal gap between outer ring 2.1 and inner ring 1.1; on the other hand, a small and always constant scanning distance between sensor 2.2 and graduation ring 1.2 may be provided in this manner as well, thereby making it possible to achieve an increased signal quality. Only by these measures is it possible to read out, at a high resolution, magnetic angle scalings 1.21, which have distances between the centers of the graduation marks in the circumferential direction of less than 300 μm, e.g., less than 250 μm or less than 200 μm.

Figure 4A:
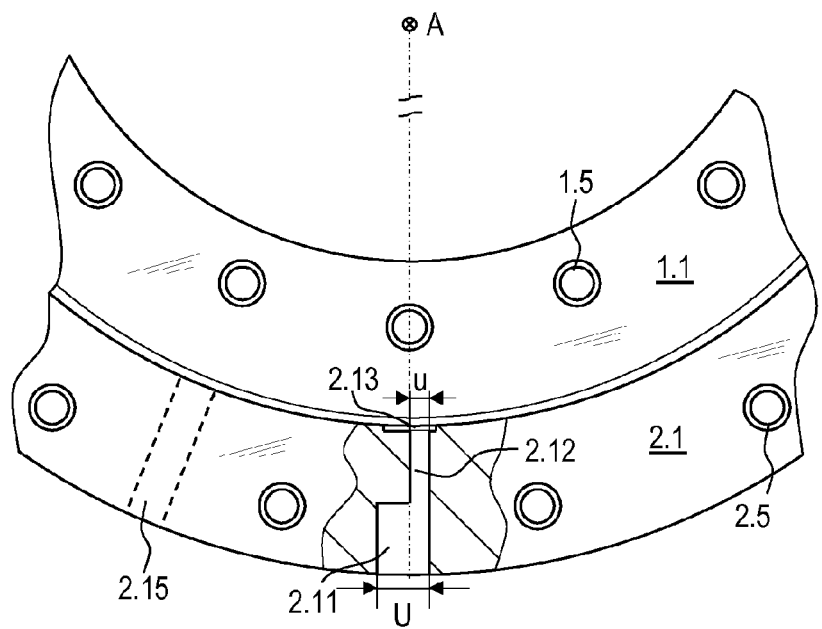
FIG. 4a is a top view of a part of the angle measuring system.
Figure 4B:
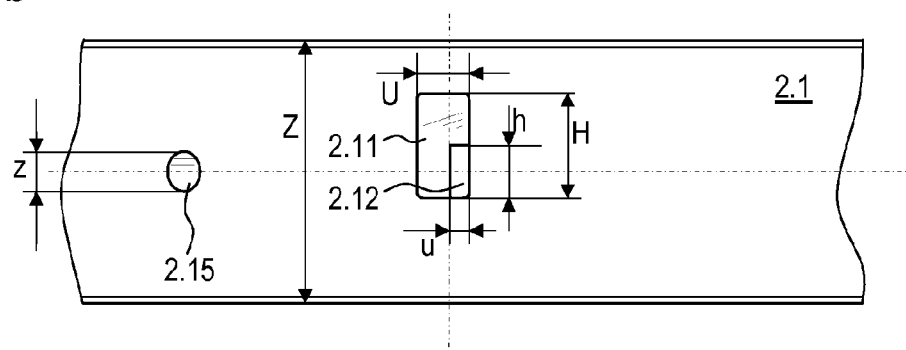
FIG. 4b is a side view of a partial area of the angle measuring system.

The special form of recesses 2.11, 2.12, 2.13 and of opening 2.15, as shown in FIGS. 4a and 4b, contributes substantially to achieving the high mechanical stiffness of the angle measuring system. First, opening 2.15 is dimensioned such that its extension z is comparatively small relative to axial extension Z of outer ring 2.1. Furthermore, first and second recesses 2.11, 2.12 are arranged such that their respective extensions in the circumferential direction U, u are smaller than their axial extensions H, h, that is, U<H, u<h. In particular, first recess 2.11 of the outer ring has its greatest extension H in a direction parallel to axis A. Moreover, outer ring 2.1 is dimensioned such that extension H of first recess 2.11 is greater than extension h of second recess 2.12 (H>h), respectively in relation to a direction parallel to axis A. In addition, extension U of first recess 2.11 is greater than extension u of second recess 2.12 (U>u), respectively in relation to the circumferential direction.

The angle measuring system represents an autonomous unit which a user is readily able to mount on a shaft to be measured, but which provides exceedingly exact angular positions. Because of the exceedingly precise arrangement of the angle measuring system, it is possible to dispense with an alignment coupling.

When operating the angle measuring system, sensor 2.2 supplies position-dependent currents or voltages, corresponding to the poles of angle scaling 1.21 facing opposite sensor 2.2. These currents or voltages are processed in electronic circuit 2.31 and ultimately digitized. The digital signals may then be passed on by the angle measuring system to sequential electronics, the digitization allowing for a largely interference-resistant data transmission.

Moreover, due to the integrated type of construction, the angle measuring system is very compact in its outside dimensions, and, in particular, has an extremely small maximum axial extension Z. In the exemplary embodiment shown, axial extension Z amounts to only approximately 25% of the maximum outside radius. Moreover, due to the type of construction described, a high-quality angle measuring system is created which is suitable for large diameters of shafts to be measured. Thus, the angle measuring system described herein has a suitable opening, whose inside radius comes to approximately 66% of the maximum outside radius.

What is claimed is:

1. An angle measuring system, comprising:
    a first component group including a first ring having a first running surface and an angle scaling;
    a second component group including a sensor adapted to scan the angle scaling and a printed circuit board having an electronic circuit adapted to evaluate sensor signals producible by the scanning, the second component group including a solid ring having a second running surface and having a first recess adapted to accommodate the printed circuit board and a second recess adapted to accommodate an electrical conductor; and
    rolling elements arranged between the first running surface and the second running surface;
    wherein the conductor electrically connects the sensor to the electronic circuit situated at a distance from the sensor;
    wherein the first component group is rotatable about an axis relative to the second component group; and
    wherein the first recess has an opening at an outer circumference of the ring, the first recess adapted to receive the printed circuit board in a direction toward the axis, an extension of the first recess in a direction parallel to the axis being greater than an extension of the first recess in a circumferential direction.

2. The angle measuring system according to claim 1, wherein the solid ring includes a third recess adapted to accommodate the sensor.

3. The angle measuring system according to claim 1, wherein the solid ring is arranged as at least one of (a) a metallic ring and (b) a steel ring.

4. The angle measuring system according to claim 1, wherein an extension of the first recess is greater than an extension of the second recess in relation to a direction parallel to the axis.

5. The angle measuring system according to claim 1, wherein the electrical conductor has a cross-section of different outside dimensions, a greater outside dimension of the electrical conductor being arranged in a direction parallel to the axis.

6. The angle measuring system according to claim 1, wherein the solid ring includes a third recess adapted to accommodate the sensor, the sensor insertable into the third recess in a direction away from the axis.

7. The angle measuring system according to claim 1, wherein the angle scaling is aligned to have a directional component parallel to the axis.

8. The angle measuring system according to claim 1, wherein the angle scaling includes regions having different magnetic polarization.

9. The angle measuring system according to claim 8, wherein the sensor includes at least one of (a) an MR sensor and (b) a Hall sensor.

10. The angle measuring system according to claim 1, wherein the first component group and the second component group are axially free from play with respect to each other.

11. The angle measuring system according to claim 1, wherein each of the first component group and the second component group includes two running surfaces, the rolling elements arranged between the running surfaces, the angle scaling arranged axially between the running surfaces.

12. The angle measuring system according to claim 1, wherein the solid ring is arranged as a metallic ring.

13. The angle measuring system according to claim 1, wherein the solid ring is arranged as a steel ring.

* * * * *